United States Patent
Yamada et al.

(10) Patent No.: US 8,606,883 B2
(45) Date of Patent: Dec. 10, 2013

(54) IP BROADCAST RECEIVER APPARATUS

(75) Inventors: Hajime Yamada, Osaka (JP); Toshinori Shimizu, Osaka (JP); Ryuhsuke Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 469 days.

(21) Appl. No.: 13/120,937

(22) PCT Filed: Oct. 7, 2009

(86) PCT No.: PCT/JP2009/067463
§ 371 (c)(1),
(2), (4) Date: Mar. 25, 2011

(87) PCT Pub. No.: WO2010/044362
PCT Pub. Date: Apr. 22, 2010

(65) Prior Publication Data
US 2011/0185046 A1    Jul. 28, 2011

(30) Foreign Application Priority Data

Oct. 14, 2008    (JP) .................................. 2008-265671

(51) Int. Cl.
G06F 15/16    (2006.01)
(52) U.S. Cl.
USPC ......................................... 709/219; 709/231
(58) Field of Classification Search
None
See application file for complete search history.

(56) References Cited

U.S. PATENT DOCUMENTS

| | | |
|---|---|---|
| 2002/0112247 A1 | 8/2002 | Horner et al. |
| 2002/0184643 A1 | 12/2002 | Fichet |
| 2003/0174248 A1 | 9/2003 | Maruyama |
| 2005/0091698 A1* | 4/2005 | Shikata .......................... 725/132 |
| 2005/0243854 A1* | 11/2005 | Ward ............................ 370/437 |
| 2008/0155612 A1 | 6/2008 | Ikeda et al. |

FOREIGN PATENT DOCUMENTS

| | | |
|---|---|---|
| JP | 2002-142170 A | 5/2002 |
| JP | 2003-274309 A | 9/2003 |
| JP | 2004-88383 A | 3/2004 |
| JP | 2005-130082 A | 5/2005 |
| JP | 2008-160199 A | 7/2008 |
| RU | 2274957 C2 | 4/2006 |
| WO | WO 03/079220 A1 | 9/2003 |

OTHER PUBLICATIONS

Russian Office Action for corresponding Application No. 2011119507 issued Feb. 1, 2013 with an English translation.

* cited by examiner

*Primary Examiner* — Peling Shaw
(74) *Attorney, Agent, or Firm* — Birch, Stewart, Kolasch & Birch, LLP

(57) ABSTRACT

There is provided an IP broadcast receiver apparatus capable of, even when the input of a stream is delayed, determining whether a stream is to be inputted later and displaying a picture when a stream is inputted. When the content providing side makes a request to set a streamstatus attribute to "play" in a display using BML, the IP broadcast receiver apparatus determines whether channel information has been acquired from an IP broadcast server. The IP broadcast receiver apparatus sets the streamstatus attribute to "play" if channel information has been acquired from the IP broadcast server and sets the streamstatus attribute to "stop" if channel information has not been acquired from the IP broadcast server.

4 Claims, 4 Drawing Sheets

IP BROADCAST RECEIVER APPARATUS

TECHNICAL FIELD

The present invention relates to a broadcast receiver apparatus and, more particularly, to a broadcast receiver apparatus capable of receiving an IP broadcast.

BACKGROUND ART

In an IP broadcast receiver apparatus, data for displaying a portal site or the like is generally described in a BML (Broadcast Markup Language) description format. When an IP broadcast receiver apparatus receives an IP broadcast, the content providing side confirms whether a picture is being displayed by reading a streamstatus attribute that is an attribute of an object described in BML and determining whether a stream is inputted to the broadcast receiver apparatus.

Although the attribute can be read/written by the content providing side, it has not been used for the convenience in viewing.

Patent Document 1 discloses an IP broadcasting system including a management device between an IP broadcasting server and an IP broadcasting terminal and capable of efficiently managing an IP broadcasting channel number and a multicast address even if the number of IPTV broadcasting channels and the number of IP broadcasting terminals increase. Patent Document 1: JP Patent Publication (Kokai) No. 2008-160199 A

DISCLOSURE OF THE INVENTION

Problems to be Solved by the Invention

Even if the streamstatus attribute of an object described in BML is set to "play," a stream may not be immediately inputted for some reason. As described above, whether a picture is being displayed is confirmed by reading a streamstatus attribute. Accordingly, when the content providing side makes a request to set a streamstatus attribute to "play" in a display using BML, a conventional IP broadcast receiver sets the streamstatus attribute to "stop" if a stream is not inputted within a fixed period of time after the streamstatus attribute is set to "play." Not only when streams are not continuously inputted after that due to some trouble but also when the input of a stream is delayed by accident, the IP broadcast receiver cannot receive a stream inputted after the fixed period of time and display a picture.

The present invention has been made in consideration of the above-described circumstances, and has as its object to provide an IP broadcast receiver apparatus capable of, even when the input of a stream is delayed, determining whether a stream is to be inputted later and displaying a picture when a stream is inputted.

Means for Solving the Problems

An IP broadcast receiver apparatus according to the present invention determines whether channel information has been acquired from an IP broadcast server When a request to set a streamstatus attribute to "play" is made from a content providing side in a display using BML. The IP broadcast receiver apparatus sets the streamstatus attribute to "play" if channel information has been acquired from the IP broadcast server and sets the streamstatus attribute to "stop" if channel information has not been acquired from the IP broadcast server.

A method according to the present invention includes a step of producing a display using BML, a step of receiving a request to set a streamstatus attribute to "play" from a content providing side, a step of determining whether channel information has been acquired from an IP broadcast server, a step of setting the streamstatus attribute to "play" if channel information has been acquired, and a step of setting the streamstatus attribute to "stop" if channel information has not been acquired.

The present invention may be a program for causing a computer to perform the above-described method. Alternatively, the present invention may be a computer-readable recording medium having the program recorded thereon. The program may be acquired via a transmission medium such as the Internet.

Advantage of the Invention

Even when the input of a stream is delayed, an IP broadcast receiver apparatus according to the present invention can determine whether a stream is to be inputted later and display a picture when a stream is inputted.

DESCRIPTION OF SYMBOLS

Figure 1:
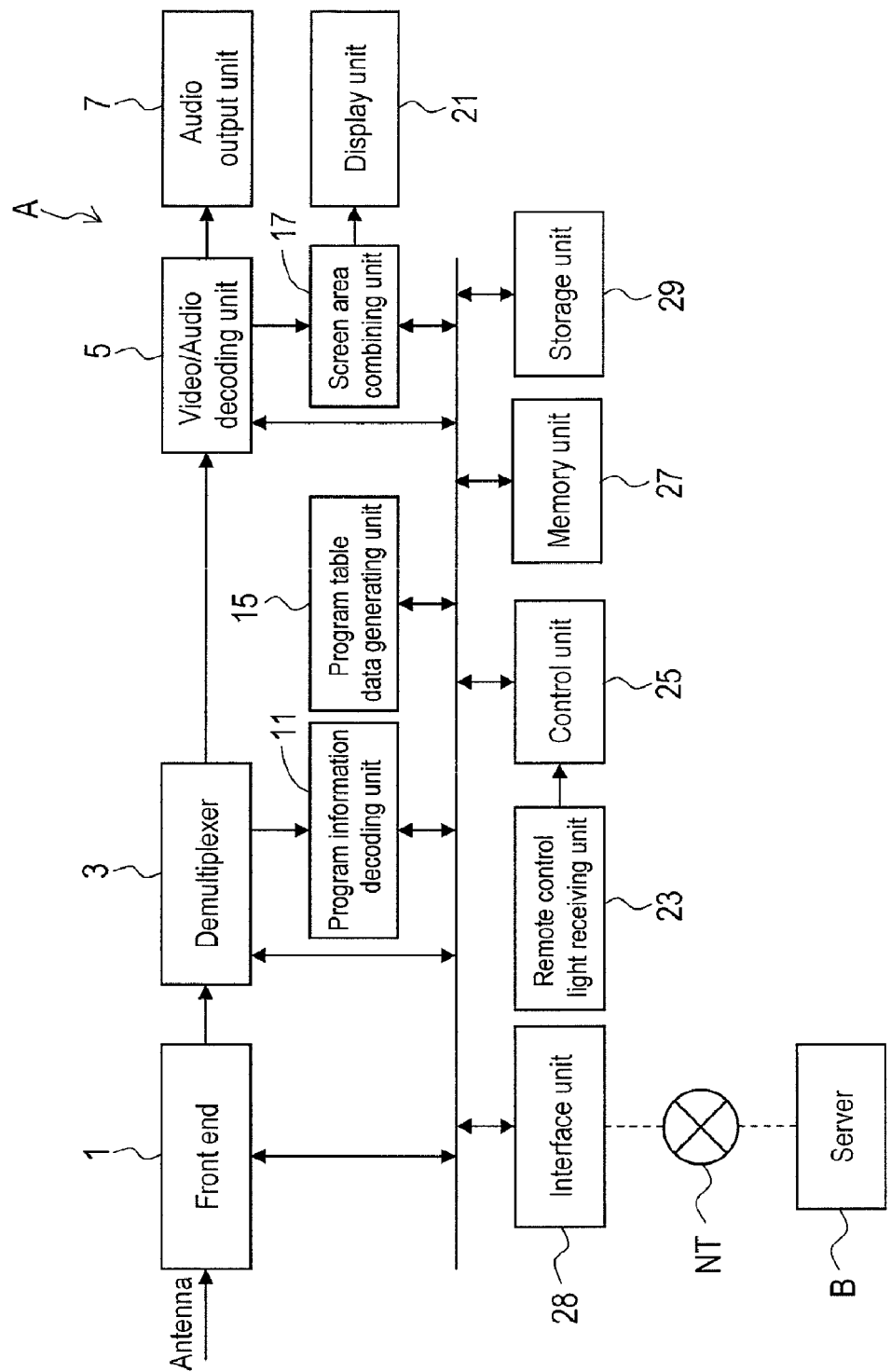
FIG. 1 is a block diagram showing an example of the configuration of a broadcast receiver apparatus according to the present invention.

A digital broadcast receiver apparatus
1 front end
3 demultiplexer
5 video/audio decoding unit
7 audio output unit
11 program information decoding unit
17 screen area combining unit
21 display unit
25 control unit
28 interface unit
29 storage unit
NT Internet
B content server

BEST MODE FOR CARRYING OUT THE INVENTION

FIG. 1 is a block diagram showing an example of the configuration of a broadcast receiver apparatus according to the present invention. A digital broadcast receiver apparatus A shown in FIG. 1 includes a front end 1 which receives signals of a digital broadcast from an antenna and performs channel selection and the like, a demultiplexer 3, a video/audio decoding unit 5 which decodes an output from the demultiplexer 3, a screen area combining unit 17 which generates signals for displaying a composite of decoded video signals and program table data (to be described later), a display unit 21 which is based on signals generated by the screen area combining unit 17, and an audio output unit 7 which outputs sounds.

The digital broadcast receiver apparatus also includes a program information decoding unit 11 which decodes program information outputted from the demultiplexer 3 and an electronic program table generating unit 15 which generates an electronic program table on the basis of the program information decoded by the program information decoding unit 11.

The digital broadcast receiver apparatus further includes an interface unit 28 which forms an interface with another external device, a remote control light receiving unit 23 which receives a remote control signal from a remote control serving as a control device, a control unit (CPU) 25 which controls the entire apparatus, a memory unit (RAM and ROM) 27 on which an application program for various processes to be executed by the control unit 25 is recorded and which expands the program and supplies the expanded program to the CPU, and a storage unit which stores a CDN configuration information file and channel information (to be described later). The interface unit 28 can receive digital content delivered from a content server B over a CDN (to be described later). The control unit 25 also performs control associated with channel selection when IPTV is selected.

Figure 2:
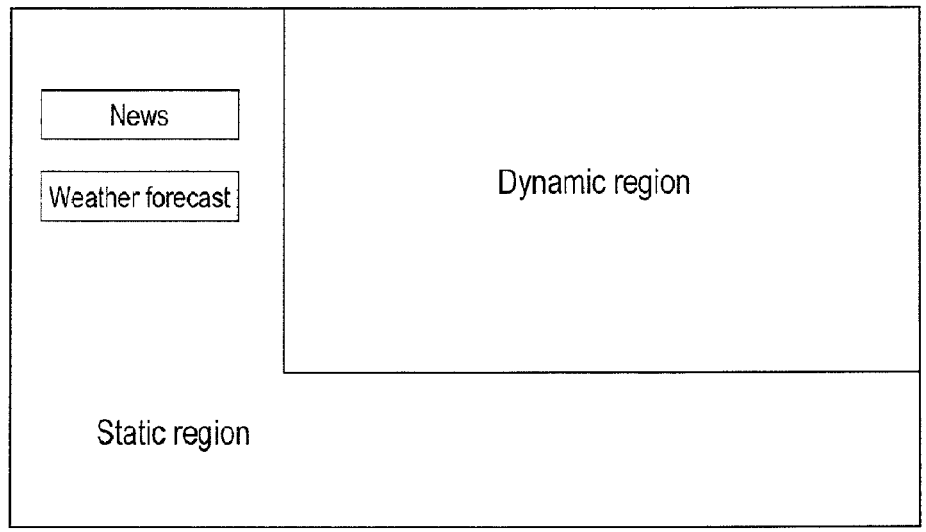
FIG. 2 is a view for explaining a portable site displayed in an L-shape.

An IP broadcast receiver apparatus displays a portal site when the IP broadcast receiver apparatus is powered on, and an IP broadcasting button on a remote control is pressed. For example, the portal site is composed of an L-shaped static region where buttons for content selection, a notification, and the like are arranged and a dynamic region where a content picture is displayed, as shown in FIG. 2. For example, when a weather forecast button in the static region is pressed by operating the remote control, weather forecast content is displayed in the dynamic region.

Data for displaying the portal site is described in BML (Broadcast Markup Language). A picture displayed in the dynamic region is described with a picture object.

Figure 3:
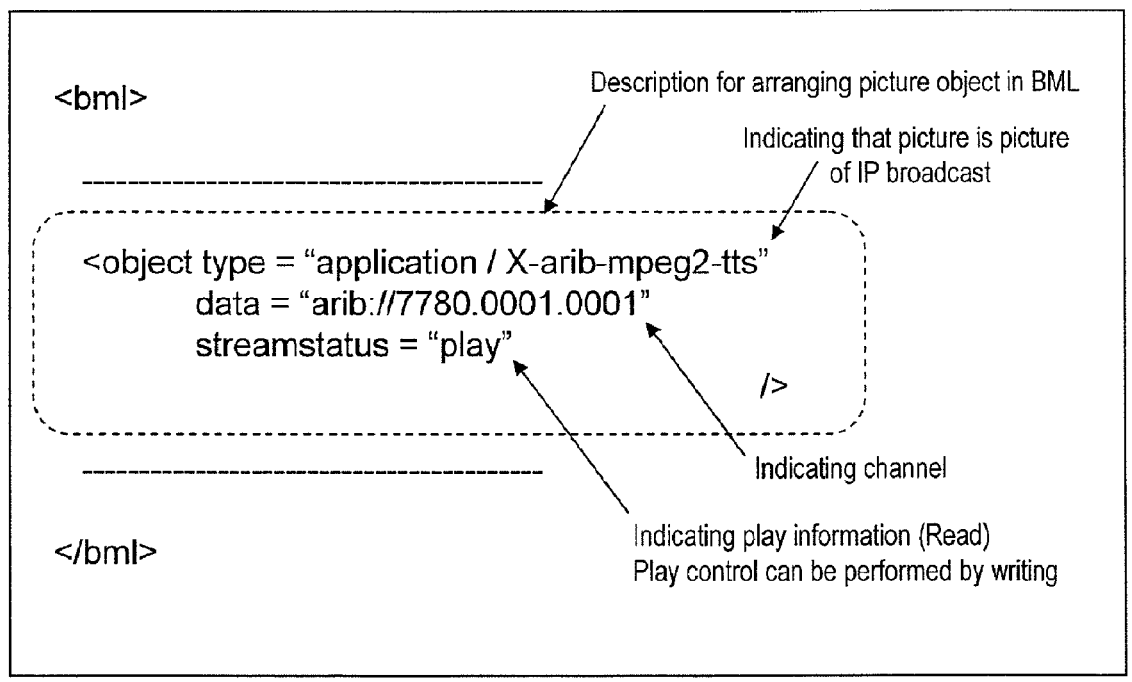
FIG. 3 is a view for explaining a picture object in a BML document.

FIG. 3 is a view for explaining a picture object in a BML document. In a piece of BML text between the <bml> tag and the </bml> tag, an "object" tag like a part surrounded by a broken line in FIG. 3 can be described as a description for arranging a picture object. In an "object" tag, the type of a picture can be specified with an attribute "type." In the example in FIG. 3, the attribute "type" indicates that a picture is a picture of an IP broadcast. An IP broadcast channel can be specified with an attribute "data." An attribute "streamstatus" can be set to "play" indicating a play state or "stop" indicating a nondisplayed state. These attributes can be read/written by a script from the content providing side. For example, assume that a script is written such that if the weather forecast button in the static region is pressed, a streamstatus attribute is set to "stop," an IP broadcast is stopped, a data attribute is changed to a weather forecast channel, and the streamstatus attribute is set back to "play." In this case, when the weather forecast button in the static region is pressed, weather forecast content starts to be displayed in the dynamic region.

A streamstatus attribute with a value of "play" serves as an instruction to join a multicast address. The streamstatus attribute with a value of "stop" serves as an instruction to leave a joined multicast address. Joining a multicast address requires acquisition of channel information from a SI (Service Information)-dedicated TS (Transport Stream), and the acquisition of channel information requires joining the SI-dedicated TS.

Upon receipt of a request to set a streamstatus attribute to "play," an IP broadcast receiver apparatus according to the present invention determines that a stream is to be inputted and sets the streamstatus attribute to "play" if channel information is present, i.e., if channel information has been acquired from an IP broadcast server. Even if a stream is inputted late, since the streamstatus attribute remains "play," the IP broadcast receiver apparatus can receive the stream and display a picture.

The content providing side reads a streamstatus attribute and determines, on the basis of whether the streamstatus attribute is "play" or "stop," whether a stream is being inputted to an IP broadcast receiver apparatus, thereby confirming whether a picture is being displayed. Accordingly, if streams are not continuously inputted, the streamstatus attribute needs to be set to "stop." An IP broadcast receiver apparatus according to the present invention determines that streams are not continuously inputted and does not set a streamstatus attribute to "play" if channel information is not present.

A specific process to be performed in response to a request to set a streamstatus attribute to "play" in an IP broadcast receiver apparatus according to the present invention will be described. First, a process to be performed in response to a request to set a streamstatus attribute to "play" in a conventional IP broadcast receiver apparatus serving as an object to be compared will be described.

Figure 4:
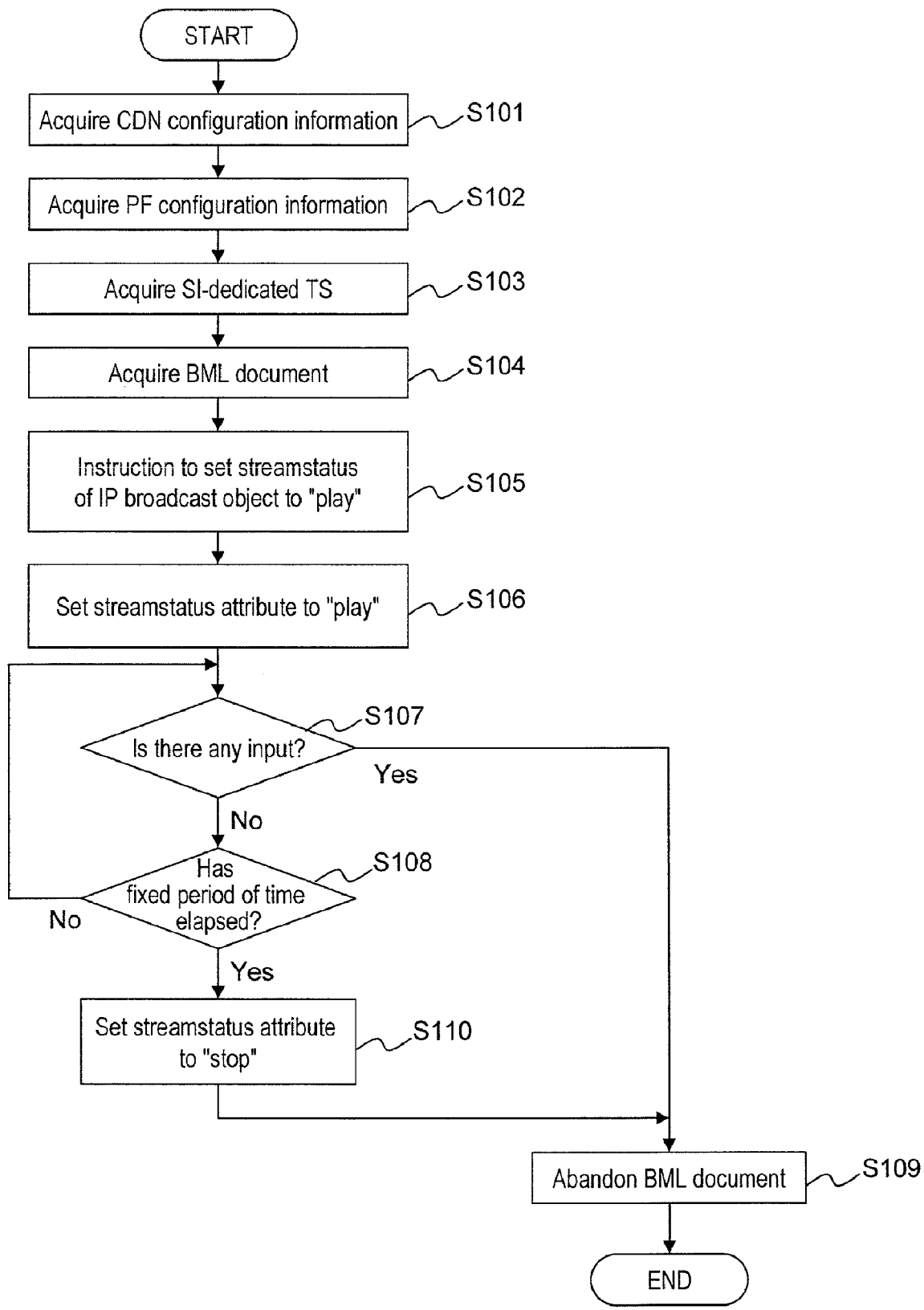
FIG. 4 is a flow chart for explaining a process to be performed in response to a request to set a streamstatus attribute to "play" in a conventional IP broadcast receiver apparatus.

FIG. 4 is a flow chart for explaining the process to be performed in response to a request to set the streamstatus attribute to "play" in the conventional IP broadcast receiver apparatus. In step S101, the IP broadcast receiver apparatus acquires CDN configuration information. In step S102, the IP broadcast receiver apparatus acquires PF configuration information on the basis of information described in the CDN configuration information. In step S103, the IP broadcast receiver apparatus acquires an SI-dedicated TS on the basis of information described in the PF configuration information. In step S104, the IP broadcast receiver apparatus acquires a BML document on the basis of the information described in the PF configuration information. Assume that the IP broadcast receiver apparatus has received an instruction to set the streamstatus attribute of an IP broadcast object to "play" from the content providing side in step S105.

In step S106, the IP broadcast receiver apparatus sets the streamstatus attribute to "play." In steps S107 and S108, the IP broadcast receiver apparatus determines whether a stream has been inputted within a fixed period of time. If a stream has been inputted within the fixed period of time, the IP broadcast receiver apparatus abandons the BML document in step S109 and ends the process. On the other hand, if no stream has been inputted within the fixed period of time, the IP broadcast receiver apparatus sets the streamstatus attribute to "stop" in step S110, abandons the BML document in step S109, and ends the process.

In this conventional process, if no stream has been inputted within the fixed period of time after the streamstatus attribute is set to "play," the streamstatus attribute is always set to "stop." Accordingly, if a stream is inputted after a lapse of the fixed period of time, the IP broadcast receiver apparatus cannot receive the stream and display a picture.

Figure 5:
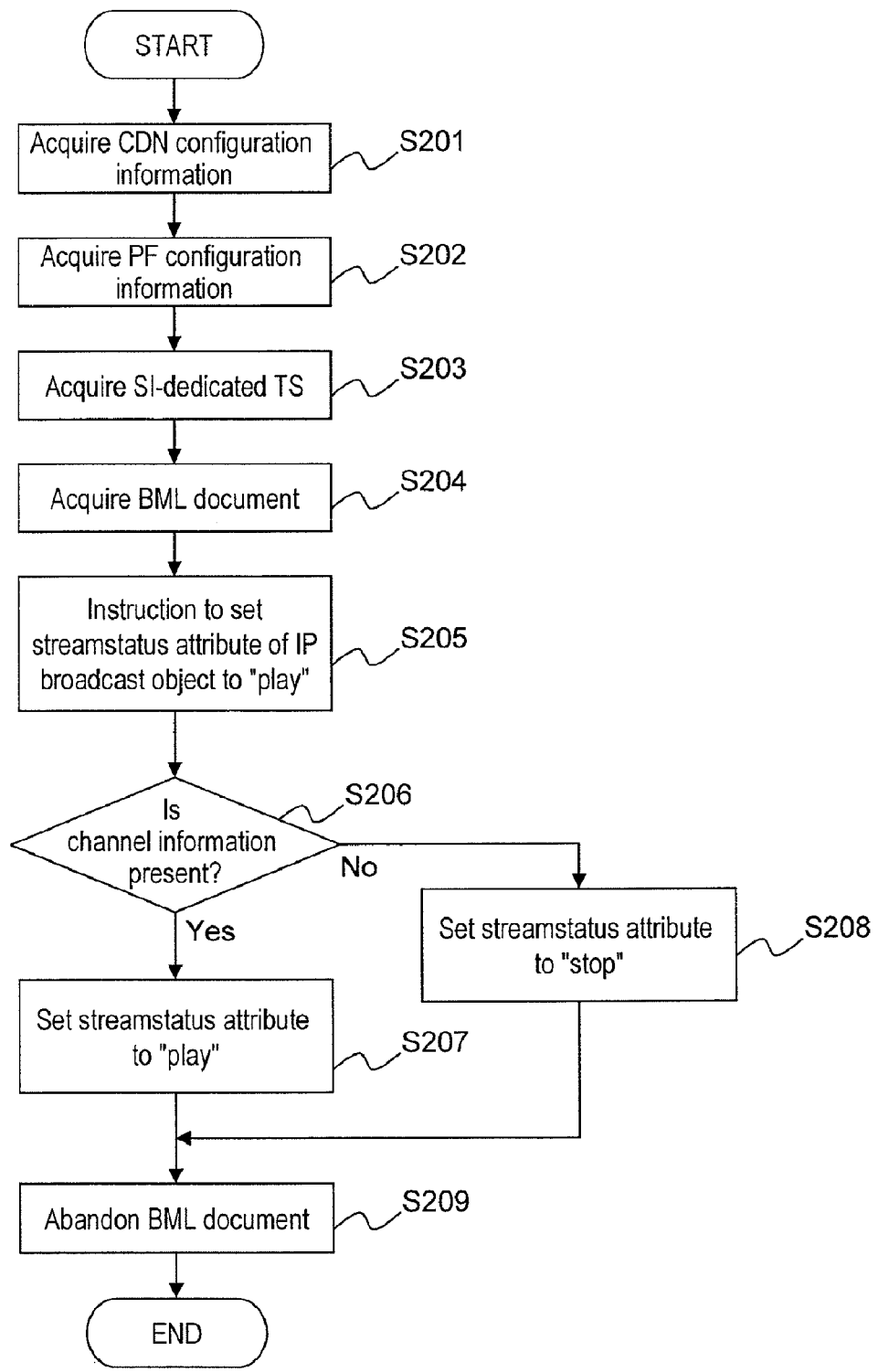
FIG. 5 is a flow chart for explaining a process to be performed in response to a request to set a streamstatus attribute to "play" in an IP broadcast receiver apparatus according to the present invention.

FIG. 5 is a flow chart for explaining a process to be performed in response to a request to set a streamstatus attribute to "play" in an IP broadcast receiver apparatus according to the present invention will be described. In step S201, the IP broadcast receiver apparatus acquires CDN configuration information. In step S202, the IP broadcast receiver apparatus acquires PF configuration information on the basis of information described in the CDN configuration information. In step S203, the IP broadcast receiver apparatus acquires an SI-dedicated TS on the basis of information described in the PF configuration information. In step S204, the IP broadcast receiver apparatus acquires a BML document on the basis of the information described in the PF configuration information. Assume that the IP broadcast receiver apparatus has received an instruction to set the streamstatus attribute of an IP broadcast object to "play" from the content providing side in step S205. The process is the same as the process in the conventional IP broadcast receiver apparatus so far.

In step S206, the IP broadcast receiver apparatus determines whether channel information is present, i.e., whether a process of joining the SI-dedicated TS and correctly acquiring channel information in step S203 has been successful. If channel information is present, the IP broadcast receiver apparatus sets the streamstatus attribute to "play" in step S207. On the other hand, if no channel information is present, the IP broadcast receiver apparatus sets the streamstatus attribute to "stop" in step S208. The IP broadcast receiver apparatus abandons the BML document in step S209 and ends the process.

An IP broadcast receiver apparatus according to the present invention determines whether a stream is to be inputted, on the basis of the presence or absence of channel information. Even when the input of a stream is delayed, if channel information is present, the IP broadcast receiver apparatus determines that a stream is to be inputted later and allows a streamstatus attribute to be set to "play." Accordingly, when a stream is inputted, the IP broadcast receiver apparatus can display a picture. On the other hand, if no channel information is present, the IP broadcast receiver apparatus determines that no streams are to be continuously inputted and sets the streamstatus attribute to "stop" to indicate that no stream is being inputted when the streamstatus attribute is read.

INDUSTRIAL APPLICABILITY

The present invention is applicable to an IP broadcast receiver apparatus.

The invention claimed is:

1. An IP broadcast receiver apparatus comprising:
a receiving unit configured to receive a request; and
a controller, wherein, in response to the request to set a streamstatus attribute to "play" is made from a content providing side in a display using BML, the controller is configured to:
  determine whether channel information has been acquired from an IP broadcast server,
  set the streamstatus attribute to "play" in response to channel information being acquired from the IP broadcast server, and
  set the streamstatus attribute to "stop" in response to channel information not being acquired from the IP broadcast server.

2. A method comprising:
producing a display using BML;
receiving a request to set a streamstatus attribute to "play" from a content providing side;
determining whether channel information has been acquired from an IP broadcast server;
setting the streamstatus attribute to "play" in response to channel information being acquired; and
setting the streamstatus attribute to "stop" in response to channel information not being acquired.

3. A non-transitory computer-readable medium having instructions stored thereon, such that when the instructions are read and executed by a processor, the processor is configured to perform the method according to claim 2.

4. An IP broadcast receiver apparatus comprising:
a producing unit configured to produce a display using BML;
a receiving unit configured to receive a request to set a streamstatus attribute to "play" from a content providing side;
a determining unit configured to determine whether channel information has been acquired from an IP broadcast server; and
a setting unit configured to set the streamstatus attribute to "play" in response to channel information being acquired and to set the streamstatus attribute to "stop" in response to channel information not being acquired.

* * * * *